No. 707,254. Patented Aug. 19, 1902.
A. F. POILLEVILLAIN DIT PAUL VILLAIN.
APPARATUS FOR INDICATING WHEN CERTAIN PREDETERMINED SPEEDS ARE EXCEEDED BY VEHICLES.
(Application filed May 10, 1901.)
(No Model.) 3 Sheets—Sheet 1.
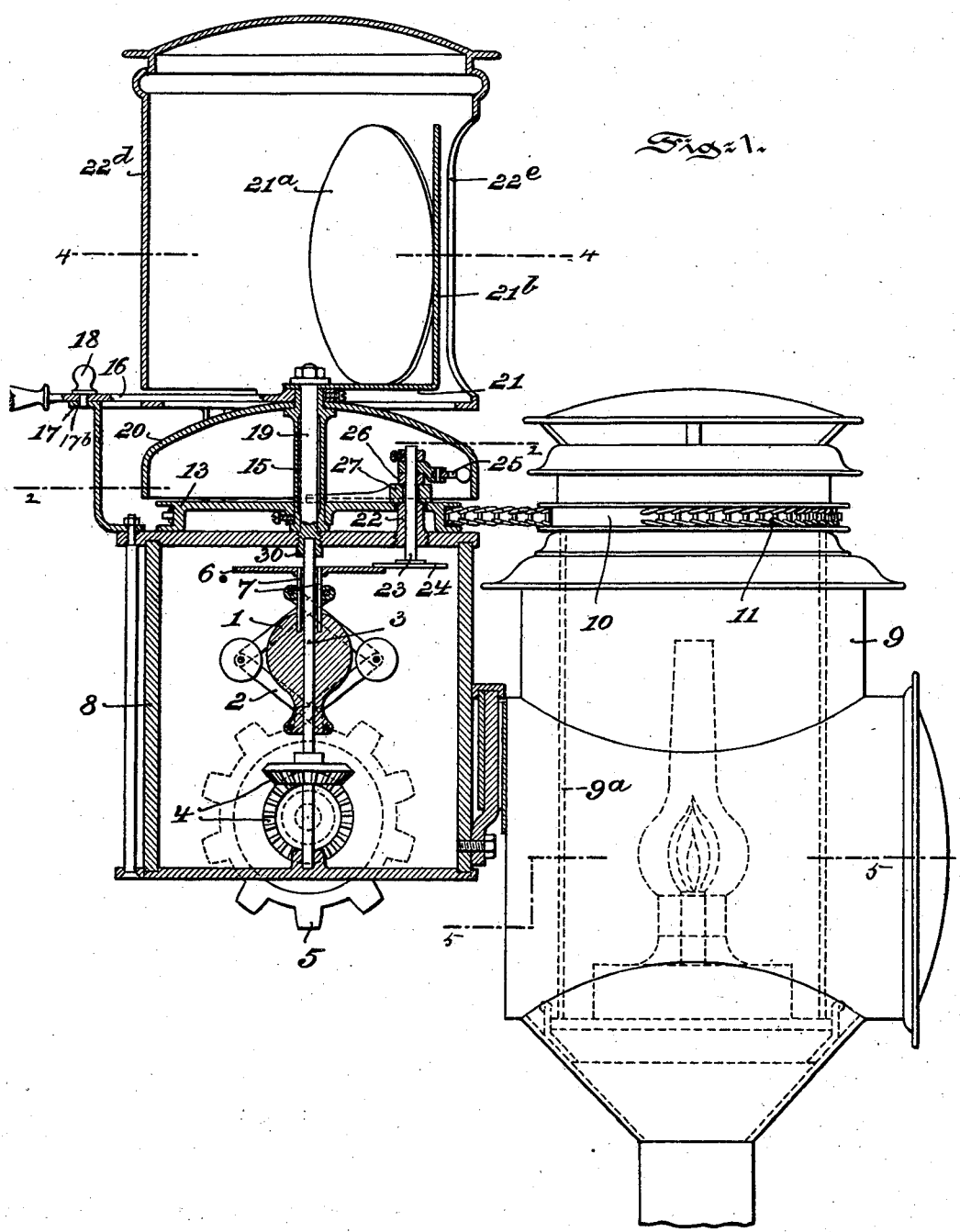

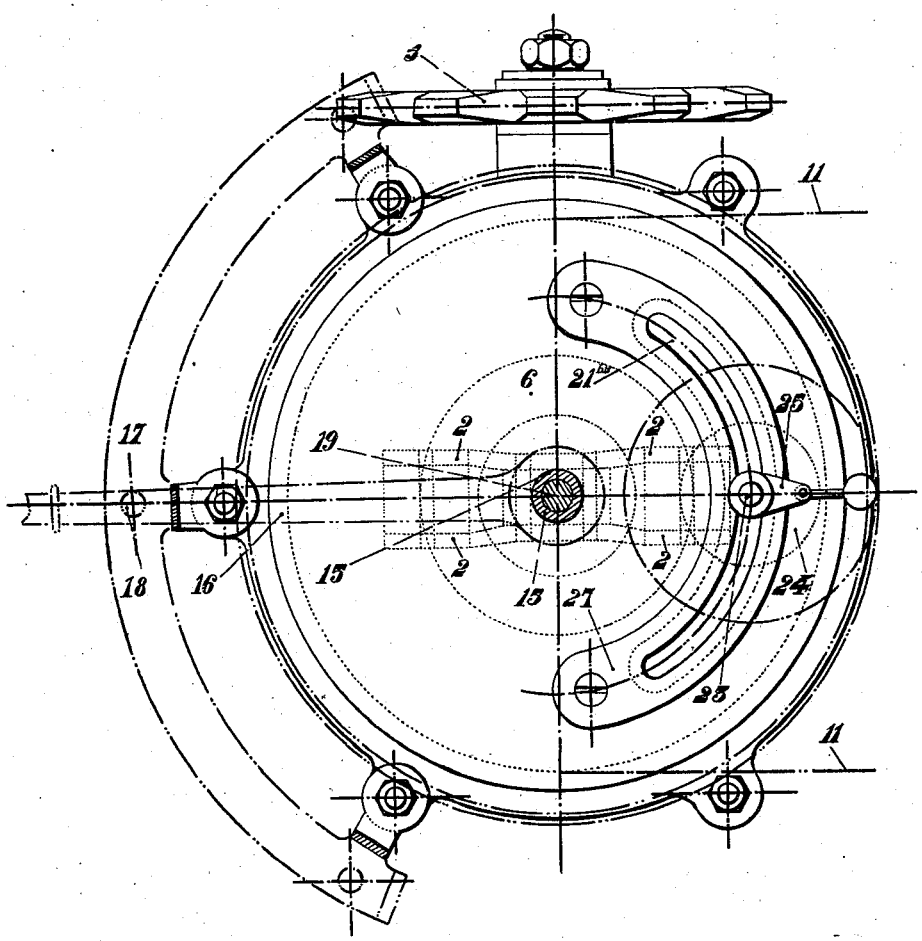

No. 707,254. Patented Aug. 19, 1902.
A. F. POILLEVILLAIN DIT PAUL VILLAIN.
APPARATUS FOR INDICATING WHEN CERTAIN PREDETERMINED SPEEDS ARE EXCEEDED BY VEHICLES.
(Application filed May 10, 1901.)
(No Model.) 3 Sheets—Sheet 3.
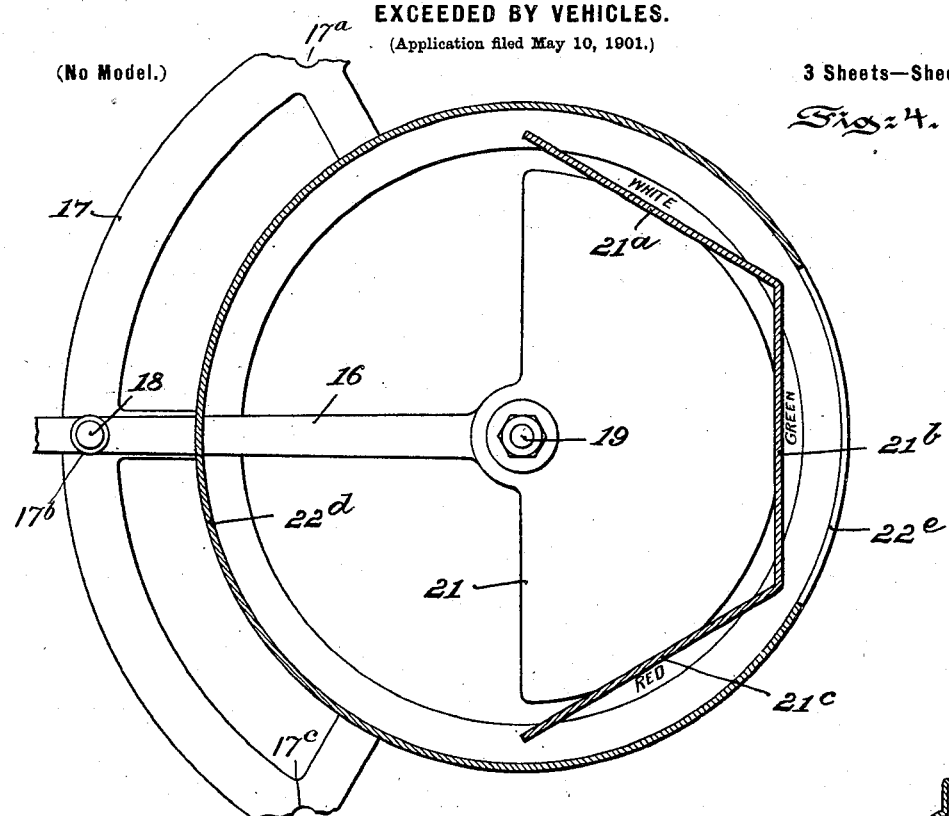
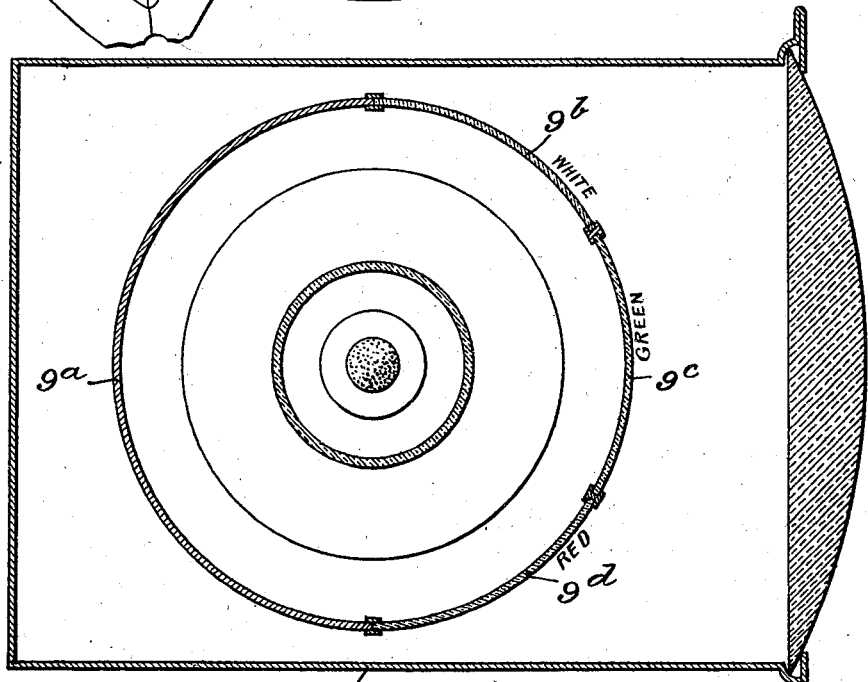

UNITED STATES PATENT OFFICE.

AUGUSTE FRANÇOIS POILLEVILLAIN DIT PAUL VILLAIN, OF PARIS, FRANCE.

APPARATUS FOR INDICATING WHEN CERTAIN PREDETERMINED SPEEDS ARE EXCEEDED BY VEHICLES.

SPECIFICATION forming part of Letters Patent No. 707,254, dated August 19, 1902.

Application filed May 10, 1901. Serial No. 59,554. (No model.)

*To all whom it may concern:*

Be it known that I, AUGUSTE FRANÇOIS POILLEVILLAIN DIT PAUL VILLAIN, a citizen of the Republic of France, residing at Paris, France, have invented certain new and useful Improvements in Apparatus for Visibly and Audibly Indicating the Speed of Motor-Cars, Tram-Cars, and other Vehicles, of which the following is a specification.

My invention has relation to a device for indicating the speed at which a vehicle is to be driven and for automatically indicating when that speed is exceeded, and in such connection it relates to the construction and arrangement of such a device.

The principal object of my invention is to provide a speed-indicating apparatus which may be varied or adjusted to indicate the limit of speed at which the vehicle is to travel and which is combined with automatically-controlled means for indicating when the limit of speed is exceeded.

The nature and scope of my invention will be more fully understood from the following description, taken in connection with the accompanying drawings, forming part hereof, in which—

Figure 1 is a view, partly in vertical section and partly in side elevation, of an apparatus embodying main features of my invention. Fig. 2 is an enlarged horizontal sectional view taken on the line 2 2 of Fig. 1. Fig. 3 is an enlarged view of the incline or cam governing the action of the bell or audible signal, the curved cam or incline being projected on a flat surface and its ends sectioned; and Figs. 4 and 5 are enlarged horizontal sectional views taken, respectively, on the lines 4 4 and 5 5 of Fig. 1.

Referring to the drawings, 1 represents the central weight of a centrifugal governor; 2, the crossed arms of said governor, which are mounted upon or fixed to the shaft 3, upon which the weight 1 is adapted to vertically slide as the arms 2 expand or contract under the influence of centrifugal force. The shaft 2 is rotated by means of miter-gearing 4, which gearing 4 is set in motion by a pinion 5. The pinion 5 in turn is operated by the wheels or other rotating part of the vehicle, (not shown,) so that the motion of the pinion 5 is governed by the speed of the vehicle. The weight 1 of the governor supports a disk 6 by means of rods or pins 7, so that said disk 6 not only rotates with the weight 1, but is also elevated and depressed as the weight 1 moves up or down on the shaft 3. A case 8 incloses the governor and its accessories and serves also as a support for the lantern 9.

Referring now to Figs. 1 and 5, within the frame of the lantern 9 is mounted a tubular frame $9^a$, encircling the flame of the lantern, and this frame carries three panels $9^b$, $9^c$, and $9^d$, of different-colored glass—for instance, white, green, and red. The tubular frame $9^a$ is secured or fixed at its top in a ring or crown 10, and partly encircling the ring or crown 10 is a sprocket-chain 11. The chain 11 also partly encircles a second ring or crown 13, keyed or otherwise secured to a sleeve 15. This sleeve 15 is adapted to be turned by a hand-lever 16 and when so turned transmits its movement through the crown or ring 13, chain 11, and ring 10 to the tubular frame $9^a$, so as to bring any one panel $9^b$, $9^c$, or $9^d$ between the flame and the lens of the lantern 9 to show a color—white, green, or red—from the lantern. In the drawings the intermediate color-panel $9^c$, which is green, is shown, and this indicates the intermediate speed of the vehicle for, say, rural localities. The white panel $9^b$ when turned in operative position indicates the lowest speed of the vehicle for, say, city localities, whereas the red panel $9^d$ when displayed from the lantern 9 indicates topmost speed. The three positions of the hand-lever 16 are secured by locking the hand-lever 16 to three points $17^a$, $17^b$, and $17^c$, respectively, on a sector 17 by means of a pin 18. The sleeve 15 turns about a fixed rod or shaft 19, supported by the roof of the casing 8, and to the sleeve 15 is fixed a gong 20.

Referring now to Figs. 1 and 4, the hand-lever 16 carries at its fulcral point 19 a platform 21, from which projects upward three panels $21^a$, $21^b$, and $21^c$, the outer faces of which correspond in color to the panels $9^b$, $9^c$, and $9^d$—that is to say, they are respectively white, green, and red. The movement of the hand-lever 16 to display a white, green, or red light from the lantern 9 also turns the panels $21^a$, $21^b$, and $21^c$ within a casing $22^d$, so as to display a correspondingly-colored panel from the opening $22^e$ in said casing $22^d$.

In the ring or crown 13 is formed an annular slot $21^{bis}$ to give passage for a sleeve 22, fixed in the roof of the casing 8. In this sleeve 22 is adapted to rotate a spindle 23, carrying at its base within the casing 8 a friction-disk 24. The spindle 23 also extends upward within the gong 20 and carries at or near its upper end a hammer-lever 25, which when the spindle 23 rotates is adapted to strike the gong 20 to give an audible signal. On the top of the ring or crown 13 is fixed an incline or cam 27, which is slotted in alinement with the slot $21^{bis}$ of ring 13. Upon this incline or cam 27 rides a collar or nut 26, interposed between the hammer-lever 25 and the incline or cam 27. When now the ring 13, with its cam or incline 27, is shifted by the hand-lever 16, the spindle 23 will be elevated or depressed as the collar or nut 26 rides up or down upon the cam 27, and hence the disk 24, carried by said spindle 23, is elevated away from the disk 6, traveling with the governor, or depressed toward the said disk 6. It follows that if the lantern-panel is to indicate low or city speed and the colored panel $21^a$ is likewise set the cam 27 is moved with the ring 13 so that the disk 24 is very near the disk 6 of the governor. It then requires but a slight rise of the governor-weight 1 to cause the disk 6 to frictionally engage the disk 24, and thereby turn said disk 24 and spindle 23. As before explained, the turning or rotation of the spindle 23 causes the hammer 25 to strike the gong 20, and hence audibly indicates an excess of speed of the vehicle. In the same manner if green or country-road speed is indicated then the incline or cam 27 is turned to a point where the spindle 23 and disk 24 are elevated to an intermediate position or that indicated in the drawings. In this position the governor-weight 1 and disk 6 must rise a further distance than in the former instance before the disk 6 touches the disk 24 to indicate through the rotation of the spindle 23 and hammer 25 an excess speed. If the light and the panels $21^c$ indicate red or maximum speed, then the incline or cam 27 preferably raises the spindle 23, so that the disk 24 is withdrawn from possible contact with the disk 6—that is to say, the disk 24 is drawn upward to a plane above the lower end of a nut or stop 30, which limits the upward movement of the disk 6.

The operation of the device is as follows: The driver or operator of the vehicle first moves the hand-lever 16 to set the proper panel $21^a$, $21^b$, or $21^c$ opposite the opening $22^e$ in the casing $22^d$. This operation of the hand-lever 16 moves the ring 13, which through the chain 11 operates the ring 10 to turn the proper panel $9^b$, $9^c$, or $9^d$ into a position between the flame and the lens of the lantern 9. There is thus displayed at two points the proper color or visible signal, the panel $21^a$, $22^b$, or $22^c$ being for day display, whereas the panel $9^b$, $9^c$, or $9^d$ is for night display. The hand-lever 16 also turns the cam 27 to control the distance between the disk 24 on the spindle 23 and the disk 6, traveling up and down on the governor-shaft. As before explained, so long as the limit of speed indicated by the visible indicators is not exceeded the governor-disk 6 does not contact with the disk 24; but when said speed is exceeded in the limits below the red or highest speed attainable then the disk 6 frictionally contacts with the disk 24 and the spindle 23 is rotated. The hammer-lever 25 now rotates and strikes the gong 20 to give an audible signal that the limit of speed has been exceeded.

Having thus described the nature and object of my invention, what I claim as new, and desire to secure by Letters Patent, is—

In a device of the character described, a series of visible signals adapted to be displayed singly to indicate visually the limit of speed of the vehicle, a hand-lever adapted to set said visible signals, a governor controlled by the speed of the vehicle, a disk adapted to be rotated and to be elevated and depressed by the governor, an audible signal, a spindle adapted when rotated to operate said audible signal, a disk carried by said spindle and arranged adjacent to the governor-disk and means controlled by the movement of the hand-lever for varying the distance between the two disks independently of the up-and-down movement of the governor-disk.

In testimony whereof I have signed this specification in the presence of two subscribing witnesses.

AUGUSTE FRANÇOIS POILLEVILLAIN
DIT PAUL VILLAIN.

Witnesses:
PAUL DE MESTRAL,
EDWARD P. MACLEAN.